(12) United States Patent
Grant

(10) Patent No.: US 10,258,025 B2
(45) Date of Patent: Apr. 16, 2019

(54) FISHING LINE CLIP

(71) Applicant: Mitchell Wayne Grant, Mechanicsville, VA (US)

(72) Inventor: Mitchell Wayne Grant, Mechanicsville, VA (US)

( * ) Notice: Subject to any disclaimer, the term of this patent is extended or adjusted under 35 U.S.C. 154(b) by 270 days.

(21) Appl. No.: 15/448,929

(22) Filed: Mar. 3, 2017

(65) Prior Publication Data

US 2017/0258065 A1 Sep. 14, 2017

Related U.S. Application Data

(60) Provisional application No. 62/304,988, filed on Mar. 8, 2016.

(51) Int. Cl.
*A01K 91/06* (2006.01)
*A01K 97/00* (2006.01)

(52) U.S. Cl.
CPC .............. *A01K 91/06* (2013.01); *A01K 97/00* (2013.01)

(58) Field of Classification Search
CPC ................................. A01K 91/06; A01K 97/00
USPC ........................................................ 43/43.1
See application file for complete search history.

(56) References Cited

U.S. PATENT DOCUMENTS

| | | | | |
|---|---|---|---|---|
| 2,464,715 A * | 3/1949 | Peterson | ................ | A01K 97/00 33/719 |
| 2,650,448 A * | 9/1953 | Lichtig | ................ | A01K 91/06 24/129 D |
| 2,659,996 A * | 11/1953 | Hegler, Jr. | ............. | A01K 97/00 43/44.6 |
| 3,447,173 A * | 6/1969 | Kleiman | ................ | A01K 97/00 132/75.5 |
| 3,727,341 A * | 4/1973 | Nye | ........................ | A01K 91/06 43/42.22 |
| 4,301,610 A * | 11/1981 | Brown | ................... | A01K 97/24 43/17.2 |
| 4,457,095 A * | 7/1984 | Stevenson | .............. | A01K 97/00 24/16 PB |
| 4,625,450 A * | 12/1986 | Roemer, Jr. | ........... | A01K 91/08 43/43.12 |
| 4,630,390 A * | 12/1986 | Burkeen | ................ | A01K 91/06 43/43.11 |
| 4,799,326 A * | 1/1989 | Mertens | ................. | A01K 97/00 294/99.2 |
| 5,822,910 A * | 10/1998 | Shewmake | ............ | A01K 91/06 43/25 |
| 10,111,412 B1 * | 10/2018 | Hebert | ................... | A01K 97/20 |
| 2002/0083632 A1 * | 7/2002 | Hyde | ...................... | G09F 3/207 40/666 |

(Continued)

FOREIGN PATENT DOCUMENTS

| | | | | | |
|---|---|---|---|---|---|
| GB | 2193422 A | * | 2/1988 | ............. | A01K 83/06 |
| GB | 2197571 A | * | 5/1988 | ............. | A01K 97/00 |

*Primary Examiner* — Christopher P Ellis
(74) *Attorney, Agent, or Firm* — John H. Thomas, P.C.

(57) ABSTRACT

A fishing line clip is a handy tool for fishermen when stringing up a fishing rod for use or storage. The line clip can be releasably attached to a fishing line that has been fed through fishing rod eyelets. The clip prevents the line from falling back through the eyelets. The clip includes a plug fixed to a line clamp. The plug is sized to be larger than the diameter of a fishing rod eyelet. The line clamp allows for convenient fixing and releasing of a fishing line to the clip.

13 Claims, 3 Drawing Sheets

(56) References Cited

U.S. PATENT DOCUMENTS

| | | | |
|---|---|---|---|
| 2004/0020240 A1* | 2/2004 | Brancato | A41F 15/002 63/3 |
| 2014/0157652 A1* | 6/2014 | Fiori | A01K 97/00 43/44.91 |
| 2016/0278356 A1* | 9/2016 | Warnke, Sr. | A01K 95/00 |
| 2017/0258064 A1* | 9/2017 | Grant | A01K 97/00 |
| 2018/0235200 A1* | 8/2018 | Coyle, Jr. | A01K 97/24 |
| 2018/0263230 A1* | 9/2018 | Porter | A01K 95/02 |
| 2018/0368379 A1* | 12/2018 | Aurich | A01K 97/00 |

* cited by examiner

FISHING LINE CLIP

This application claims the benefit of U.S. Provisional Application No. 62/304,988, filed Mar. 8, 2016 and entitled "Fishing Line Stopper", which is incorporated by reference herein in its entirety.

The present invention is directed to a fishing tool, and specifically to a fishing line clip that may be releasably attached to a fishing line to prevent that fishing line from falling through fishing rod eyelets during storage or advance preparation of a fishing rod. The line clip includes a clamp to releasably attach to the fishing line and a plug to block the clip and hold the plug and the fishing line so that they do not fall through the rod eyelets.

BACKGROUND

It is common for many fishermen to prepare their fishing rod or rods in advance of fishing trips or for storage. It can be a nuisance for a fisherman to string their fishing line through the eyelets of a fishing rod, so often this is done before a fishing outing. And since a fisherman is not necessarily sure what bait or lure they may use, they cannot fully rig their fishing rod in advance. At present, this fisherman will simply tie off the string after threading the rod eyelets. Alternatively, a fisherman can attach a hook or lure as a place holder to retain the fishing line in place in a rod. If a rod is strung with a hook or lure in advance, then those hooks may become a hazard during handling of that rod while preparing to fish or otherwise transporting a rod for a fishing outing. Similarly, a fisherman can prepare multiple rods for a fishing trip, each rod having a different fishing line strung in it. It can then be difficult to differentiate which rod is strung with which line.

SUMMARY

Accordingly, it is an object of the present invention to provide a fishing line clip that allows a fisherman to pre-thread their fishing rod and to easily attach that line to a clip to prevent that line from inadvertently falling back through the rod eyelets.

In one example, a fishing line clip comprises a plug fixed to a line clamp. The plug has a larger diameter size than a fishing rod eyelet diameter. The line clamp comprises an aperture and converging clamp side portions that form a v-slot therebetween, wherein the v-slot is adapted to physically pinch a fishing line in between the clamp side portions with a friction grip, whereby a fishing line is adapted to be releasably secured in the line clamp of the line clip to enable a user to secure the end of their fishing line in the clip to prevent it from falling back through the fishing rod eyelets. The converging clamp side portions that form the v-slot may be formed of a single, monolithic and sunstantially rigid metal piece, or alternatively a pair of metal wire sections, or still further alternatively a single metal wire section that is bent to create the v-slot. The line clip may also include a crimp collar fixed to the metal wire to retain the line clamp fixed to the plug, or alternatively may include a plastic cap cover fixed over the metal wire to retain the line clamp fixed to the plug. The plug may be colored or may display indicia on it. The plug may be in the shape of a round sphere having a diameter of about one-quarter of an inch to about one inch, or alternatively about three-eighths of an inch to about one-half of an inch. The plug may be formed of a material selected from the group consisting of plastic, polymer, wood and plastic-coated metal.

DETAILED DESCRIPTION

The line clip described herein includes both a plug and a clamp. The clamp may or may not be connected to the plug through a swivel collar. The plug is sized so that it will not pass through the eyelet of a fishing rod. The clamp is engineered to releasably secure a fishing line in it for storage or standby. Also, the fishing tool described herein is referred to as a clip, but it may alternatively be referred to as a stopper in that it stops a fishing line from falling back through fishing rod eyelets.

Figure 1:
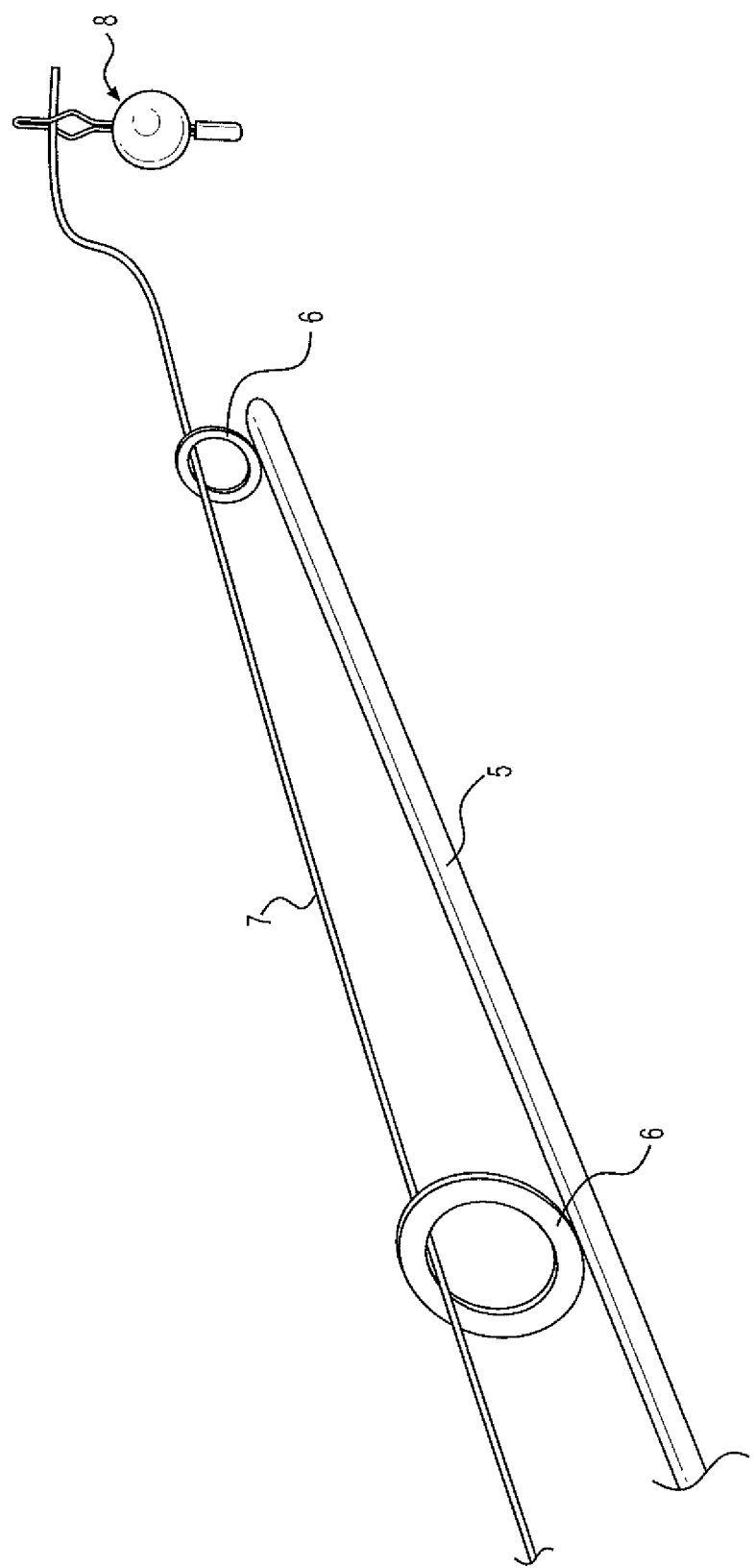
FIG. 1 is a perspective view of the end or a fishing rod and the line clip described herein clamped to a fishing line in the rod eyelets.

FIG. 1 displays a general environmental view of an end of a fishing rod 5 having eyelets 6 mounted thereon. A fishing line 7 is passed through the eyelets 6 and then clamped into the line clip 8. The line clip 8 is sized to not pass through the eyelets 6. Of course FIG. 1 is a fairly conceptual drawing as the eyelets 6 would be mounted much more securely in practice to the rod 5.

The plug is typically a round or oval spherical ball that has a diameter that is greater than the diameter of the fishing rod tip eyelet where the line stopper would be used. The term eyelet is used herein, but it may be used interchangeably with the term fishing rod guide hole. All fishing rods have a plurality of guide holes or eyelets that provide the fisherman with the extension of the rod when fishing. The plug is designed so that it will engage substantially uniformly around the perimeter or diameter of a fishing rod eyelet or guide hole. This shape of a plug may include a uniform round or conical structure. Alternatively, there may be a star or other symmetrical shape of the plug that is engineered to engage the rod eyelet around its diameter so that there is no uneven pressure on that eyelet. The plug is preferably rounded or blunt so that there would be no sharp edges on it to bear against the eyelet. It is also desired for no sharp edges to be exposed to a fisherman or other person near the fishing rod.

The plug can be fabricated of different materials. In some examples, the plug is a plastic ball or disc. The plug may be a polymer or rubber or wood or some other composite material. Preferably, the plug material is not as hard as the rod eyelet material. A metal plug, for instance, could scratch or bend or chip the eyelet during use. This is not to say that metal could not be used to form at least a part of the plug. Preferably if metal is used to form all or a part of the plug, then that metal piece would be coated in whole or in part with some plastic or rubber coating. Another benefit to a rubber, polymer, plastic, wood or composite material is that it tends to be relatively light weight.

The plug may be colored as a solid color or it may be multi-colored. The coloring may indicate a particular type or quality of fishing line on that rod. The coloring may be very bright or gaudy to highlight the tip of a fishing rod. There may be additional written indicia on the plug that indicates the type or size of the fishing line in a rod. The color may also identify a rod or an attribute of the rod itself, for instance when a fisherman brings multiple alternative rods on an outing. In another example, the plug may display indicia related to marketing or branding or other promotional or informational purposes.

The plug is fixed to a clamp on the line clip. The clamp may be rigidly fixed to the plug. Alternatively, there may be a swivel collar connected to and positioned in between the plug and the clamp of the line clip. A benefit of the swivel is to prevent or reduce any tangling of the fishing line.

The line clamp portion of the line clip includes an aperture through which the fishing line is adapted to be inserted. This line clamp portion may alternatively be referred to as a line clip portion. The clamp term is used to prevent confusion with the entire tool being referred to herein as a line clip. The line clamp also includes converging clamp side portions that form a narrow v-slot. The v-slot is wide enough to receive the fishing line and then also narrow enough to pinch the line between the converging clamp sides of the v-slot to temporarily secure the fishing line in the v-slot and/or between the clamp side portions. The line clamp may be in the form of a wire which defines the aperture and v-slot. Alternatively, the line clamp may be cut out of the back end portion of the line clip, for instance by a laser cut from the monolithic and substantially rigid body of the line clip. The aperture of the clamp has a width of about 0.5 to three millimeters, or alternatively about one to two millimeters. If the aperture is too small, it then becomes difficult to insert the fishing line into it.

In another example, the converging clamp sides of the clamp of the line clip may be literally touching or contacting each other. Especially in the bent wire example, but not limited to this example, parallel wires form the converging clamp side portions (and the clamp aperture). These wires are immediately adjacent and may be in contact with each other. In use, a fishing line is pulled into and wedged between the wire clamp side portions that frictionally grip and releasably secure the fishing line therebetween.

Figure 2:
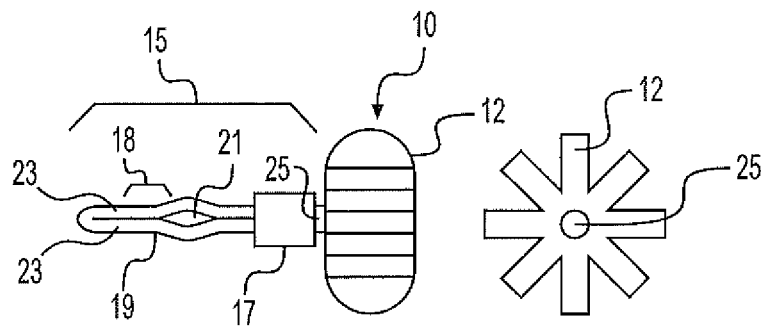
FIG. 2 is a side and bottom view of one example of a line clip as described herein.
Figure 3:
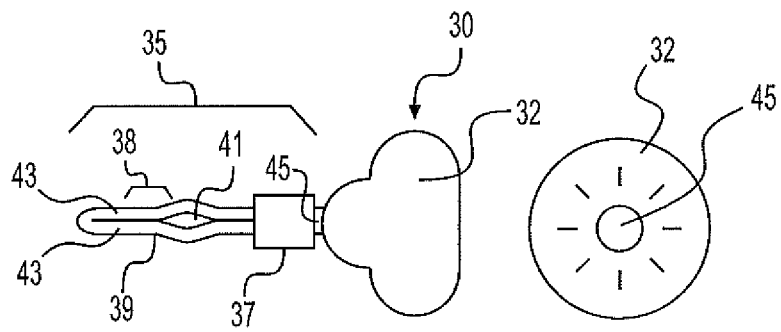
FIG. 3 is a side and bottom view of a second example of a line clip as described herein.
Figure 4:
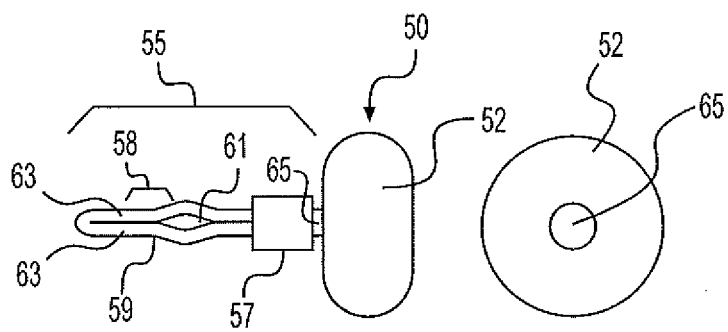
FIG. 4 is a side and bottom view of a third example of a line clip as described herein.

Turning now to FIGS. 2-4, there are shown three different line clip or stopper devices 10, 30 and 50. Each of these line clips 10, 30 and 50 is the same but for the plug portion of each, plugs 12, 32 and 52 respectively. In each case, the plug 12, 32 and 52 is connected to a line clamp 15, 35 and 55 by way of a pin 25, 45 and 65. The pin 25, 45 and 65 secures the plug 12, 32 and 52 and connects the plug to a swivel 17, 37 and 57 respectively. The line clamp portion 15, 35 and 55, in addition to the swivels 17, 37 and 57, also includes the v-slot sections 18, 38 and 58 that converge and form a slot 19, 39 and 59 between the converging clamp side portions 23, 43 and 63. Each of the clamps 15, 35 and 55 includes an aperture 21, 41 and 61 through which a fishing line may be threaded. The clamps are shown in these examples as parallel wires between which a fishing line may be pinched or clamped so that it is secured to the line clip device.

Each of the line clips 10, 30 and 50 includes a swivel 17, 37 and 57. These swivel collars are not necessary. The line clamps 15, 35 and 55 may be alternatively rigidly fixed to the respective plugs 12, 32 and 52.

The shape of the respective plugs 12, 32 and 52 is also shown in three alternative examples. The example plug 12 has a star shape. The plug 32 has a round oval portion with a conical side that is adapted to engage the circumference of a fishing rod tip eyelet. Plug 52 is an oval disc.

Figure 5:
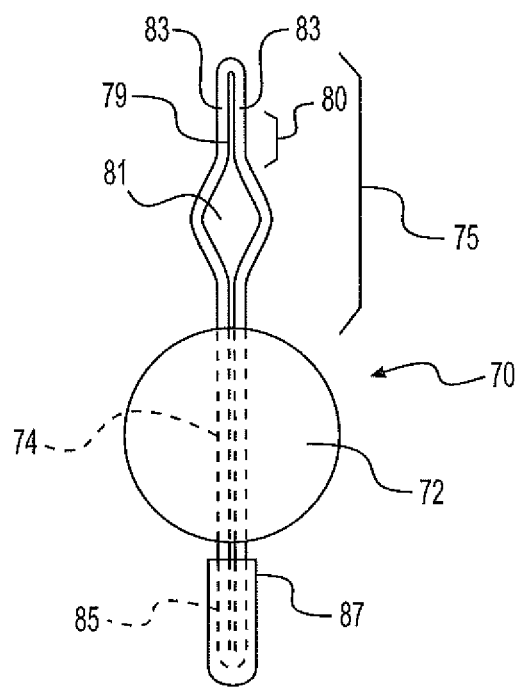
FIG. 5 is a side view of a fourth example of a line clip as described herein.
Figure 6:
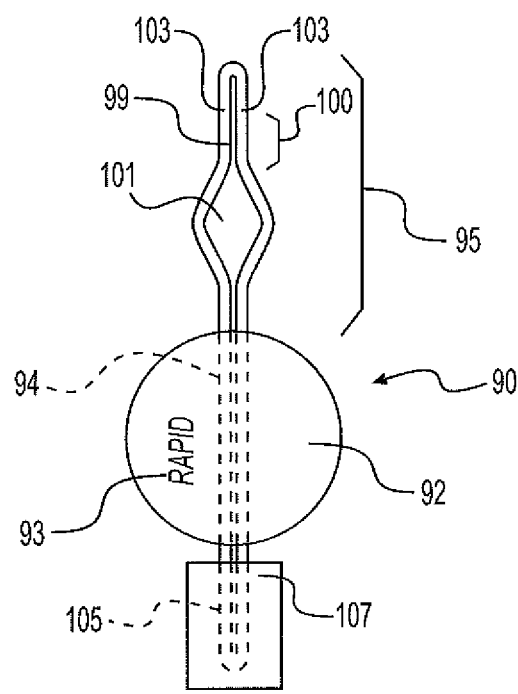
FIG. 6 is a side view of a fifth example of a line clip as described herein.

FIGS. 5 and 6 illustrate further examples of a line clip 70 and 90. In these examples, the plug 72 and 92 is a round spherical shape. Pin sections 74 and 94 connect the plugs 72 and 92 to the line clamps 75 and 95. Ends 85 and 105 are secured by a plastic cap 87 and crimp collar 107. The line clamps 75 and 95 each have apertures 81 and 101 to enable easy feeding of a fishing line through them. The line clamps 75 and 95 are formed of a single wire that is bent to the clamp shape. The converging clamp side portions 83 and 103 form v-slots 80 and 100 that form slots 79 and 99 adapted to receive and pinch or frictionally fit a fishing line between them. As indicated earlier, the plugs 72 and 92 may be colored or they may also have indicia 93 displayed thereon as shown in FIG. 6.

Other embodiments of the present invention will be apparent to those skilled in the art from consideration of the specification. It is intended that the specification and Figures be considered as exemplary only, with a true scope and spirit of the invention being indicated by the following claims.

That which is claimed is:
1. A fishing line clip comprising
a plug fixed to a line clamp;
wherein the plug has a larger diameter size than a fishing rod eyelet diameter;
wherein the line clamp comprises an aperture and converging clamp side portions that form a v-slot therebetween;
wherein the v-slot is adapted to physically pinch a fishing line in between the clamp side portions with a friction grip;
whereby a fishing line is adapted to be releasably secured in the line clamp of the line clip to enable a user to secure the end of their fishing line in the clip to prevent it from falling back through the fishing rod eyelets.
2. A fishing line clip as described in claim 1,
wherein the converging clamp side portions that form the v-slot are formed of a single, monolithic and substantially rigid metal piece.
3. A fishing line clip as described in claim 1,
wherein the converging clamp side portions that form the v-slot are formed of a pair of metal wire sections.
4. A fishing line clip as described in claim 1,
wherein the converging clamp side portions that form the v-slot are formed of a single metal wire section that is bent to create the v-slot.
5. A fishing line clip as described in claim 4,
further comprising a crimp collar fixed to the metal wire to retain the line clamp fixed to the plug.
6. A fishing line clip as described in claim 4,
further comprising a plastic cap cover fixed to the metal wire to retain the line clamp fixed to the plug.
7. A fishing line clip as described in claim 1,
further comprising a swivel collar that connects the plug to the line clamp.
8. A fishing line clip as described in claim 1,
wherein the plug is colored.
9. A fishing line clip as described in claim 1,
wherein the plug displays indicia on it.
10. A fishing line clip as described in claim 1,
wherein the shape of the plug is selected from the group consisting of a round sphere and a cone.
11. A fishing line clip as described in claim 1,
wherein the plug is in the shape of a round sphere having a diameter of from about one-quarter of an inch to about one inch.

12. A fishing line clip as described in claim 1, wherein the plug is in the shape of a round sphere having a diameter of from about three-eighths of an inch to about one-half of an inch.
13. A fishing line clip as described in claim 1, wherein the plug is formed of a material selected from the group consisting of rubber, plastic, polymer, wood and plastic-coated metal.

* * * * *